_United States Patent_ [19]

Coenen et al.

[11] 4,254,092

[45] Mar. 3, 1981

[54] METHOD FOR SEPARATING HYDROGEN CHLORIDE AND HYDROGEN BROMIDE

[75] Inventors: Alfred Coenen; Kurt Kosswig; Ekkehard Wienhöfer, all of Marl, Fed. Rep. of Germany

[73] Assignee: Chemische Werke Hüls AG, Marl, Fed. Rep. of Germany

[21] Appl. No.: 64,370

[22] Filed: Aug. 7, 1979

[30] Foreign Application Priority Data

Aug. 21, 1978 [DE] Fed. Rep. of Germany ....... 2836580

[51] Int. Cl.$^3$ .......................... C01B 7/07; C01B 7/09
[52] U.S. Cl. .................................. 423/497; 423/240; 423/481; 423/488; 423/499
[58] Field of Search ............... 423/240, 241, 481, 486, 423/497, 499; 260/583 N

[56] References Cited

U.S. PATENT DOCUMENTS

| | | | |
|---|---|---|---|
| 3,406,204 | 10/1968 | Bathellier et al. | 260/583 N |
| 3,536,593 | 10/1970 | Horley et al. | 260/583 N |
| 4,115,530 | 9/1978 | Coenen et al. | 423/488 |

OTHER PUBLICATIONS

Hickinbottom, "Reactions of Organic Compounds", Longmans, Green & Co., New York, pp. 400, 401, 416 & 417.

_Primary Examiner_—Earl C. Thomas
_Attorney, Agent, or Firm_—Gilbert L. Wells

[57] ABSTRACT

A method of separating HBr from a mixture of HBr/HCl using the difference in the stability to heat of the amine hydrohalides thereof. A mixture of HBr/HCl is treated with a solution of an amine and the HCl is split off, by the action of heat, from the amine hydrochlorides in the resulting mixture of amine hydrochlorides and amine hydrobromides, and the HBr is then recovered from the residual amine hydrobromides with the aid of a base and optionally recovered.

16 Claims, No Drawings

METHOD FOR SEPARATING HYDROGEN CHLORIDE AND HYDROGEN BROMIDE

CROSS-REFERENCE TO RELATED APPLICATIONS

Applicants claim priority under 35 USC 119 for application P 28 36 580.2, filed Aug. 21, 1978 in the Patent Office of the Federal Republic of Germany.

The disclosure of Assignee's copending application of Alfred Coenen et al entitled "Method of Manufacturing Hydrogen Chloride from Solutions of Amine Hydrochlorides" filed Feb. 6, 1979 and having Ser. No. 10,048 is incorporated herein.

BACKGROUND OF THE INVENTION

The field of the invention is the separation of hydrogen halide gases and the present invention is particularly concerned with the separation of hydrogen chloride from a mixture of hydrogen chloride contaminated with hydrogen bromide.

Hydrogen chloride is frequently obtained in industrial processes contaminated with hydrogen bromide, for example, in the case of the chlorination of bromine-containing substances or in the case of reactions with bromine chloride or bromine/chlorine mixtures.

Hydrogen chloride, which is produced from chlorine and hydrogen or obtained as a by-product from the chlorination of hydrocarbons, contains hydrogen bromide in the order of magnitude of 50 to 100 ppm. The source of these impurities is the bromine unavoidably obtained from the bromides contained in the sols employed when chlorine is obtained electrolytically.

A hydrogen bromide content always has an adverse effect during the further processing of hydrogen chloride obtained in this way, since, on the one hand, it lowers the yield of the desired product and, on the other hand, makes a purification operation necessary. Thus, for example, vinyl chloride, which is prepared from acetylene and hydrogen chloride, must be freed from proportions of vinyl bromide by distillation in order to obtain a flawless material for the polymerization to polyvinyl chloride. In addition to the necessity of a special purificiation stage, the highly corrosive character of hydrogen bromide makes its presence in hydrogen chloride appear extremely undesirable. Even traces of moisture make hydrogen bromide containing gas mixtures highly aggressive towards many metallic materials which are used industrially.

A process for the removal of hydrogen bromide from hydrogen chloride is known from Israeli Patent Specification 34,481 and as reported in Chemical Abstracts, Vol. 80 (1974) 16843q. It is characterized in that the hydrogen bromide is converted (oxidized) to bromine with the aid of chlorine and the bromine is removed with the excess chlorine in a subsequent reaction. However, this process was developed for the hydrolysis of magnesium salts and because of the very specific process conditions does not offer a generally usable method for separating hydrogen chloride and hydrogen bromide or for separating hydrogen bromide off from hydrogen chloride.

The physical properties and methods of preparation of hydrogen bromide and sodium bromide, prepared by the neutralization of sodium carbonate or hydroxide with hydrobromic acid, are disclosed in the Kirk-Othmer, "Encyclopedia of Chemical Technology," 2nd edition, vol. 3 (1964) pp. 767 and 768 and vol. 18 (1969) pp. 484 and 485.

The state of the art of the manufacture and processing of hydrochloric acid may be ascertained by reference to the Kirk-Othmer "Encyclopedia of Chemical Technology" 2nd ed., vol. 11 (1967) pp. 307–337, particularly pp. 314–315 where it is disclosed that 75% of U.S. hydrochloric acid production for the years 1961–66 came from chlorination processes, and pp. 315–323 under the section Gas Treatment and U.S. Pat. No. 4,115,530, the disclosures of which are incorporated herein.

The disclosure of U.S. patent application Ser. No. 10,048, which is not a part of the state of the art, is an improvement over U.S. Pat. No. 4,115,530.

SUMMARY OF THE INVENTION

The object of the present invention is therefore, to develop a process of general applicability for the separation of hydrogen chloride and hydrogen bromide, with which, in addition, each separated constituent can be used for further reactions.

This object is achieved according to the present invention by treating a mixture of hydrogen chloride and hydrogen bromide with a solution of an amine and the hydrogen chloride is first split off, by the action of heat, from the amine hydrochlorides in the resulting mixture of amine hydrochlorides and amine hydrobromides, and the hydrogen bromide is then split off from the residual amine hydrobromides with the aid of a base and optionally recovered.

The HBr/HCl mixture starting material has a concentration range of about 0.001 to 99 weight percent for the HBr and preferably a concentration of about 20 to 80 weight percent for HBr in the total mixture.

For first splitting off the HCl from the solution of an amine and HBr/HCl, a temperature of about 100° to 250° C. is useful and a temperature of about 120° to 230° C. is preferred.

The concentration of amine in solution can be varied from about 5 to 70 weight percent of amine and is preferably about 35 to 60 weight percent.

The concentration of HBr in the HCl split off is less than 5 parts per million.

HBr remaining in the solution of an amine, after the HCl is split off, is itself preferably recovered by methods reported in Kirk-Othmer "Encyclopedia of Chemical Technology" 3rd. ed., vol. 4 (1978) pp. 233, 245 for example.

DESCRIPTION OF THE PREFERRED EMBODIMENTS

Amines suitable for the process according to the present invention are thus those having hydrogen chlorides which split into free amine and hydrogen chloride on heating in solution. Amines which can be used for this purpose are tertiary alkylamines, tertiary aryldialkylamines, secondary arylalkylamines, primary alkylarylamines or mixtures thereof, which contain 14 to 36 carbon atoms in the nitrogen-bonded side chains, of which in the case of tertiary alkylamines, tertiary aryldialkylamines and secondary arylalkylamines at most one is a nitrogen-bonded methyl group and at least one is a nitrogen-bonded aliphatic radical containing at least 6 carbon atoms.

Suitable amines are, for example, trihexylamine, triheptylamine, trioctylamine, cyclohexyl-diisooctylamine, tri-2-ethylhexyl-amine, di-2-ethylhexyl-methylamine, didecyl ethylamine, tri-dodecyl-amine, didodecyl-methyl-amine, dodecyl-diisopropyl-amine, dodecyl-di-butyl-amine, dodecyl-diisobutyl-amine, dodecyl-isobutyl-methyl-amine, diisopentadecyl-methylamine, diisopentadecyl-ethyl-amine, diisopentadecylisopropyl-amine, N-octyl-aniline, N-2-ethylhexylaniline, N-lauryaniline, N-isotridecylaniline, N-isopentadecylaniline, N-stearylaniline, N,N-dihexylaniline, N,N-dioctylaniline, N,N-di-2-ethylhexylaniline, N,N-didodecylaniline, N-dodecyl-N-methyl-aniline, N-dodecyl-N-ethylaniline, N-dodecyl-N-hexyl-aniline, N,N-dihexyl-p-toluidine, N,N-di-2-ethylbutyl-p-toluidine, N,N-diheptyl-p-toluidine, N,N-dioctyl-p-toluidine and N,N-di-2-ethylhexyl-p-toluidine.

Suitable amine hydrochlorides and amine hydrobromides are therefore such of the above-mentioned amines, for example trihexylammoniumchloride, trihexylammoniumbromide, tri-2-ethylhexylammoniumchloride, tri-2-ethylhexylammoniumbromide, N,N-dioctylaniline-hydrochloride and N,N-dioctylaniline-hydrobromide.

The solvents used are organic liquids which are inert under the conditions of the process and preferably boil above 120° C. Suitable solvents are, for example, straight-chain or branched aliphatic, cycloaliphatic, aromatic or araliphatic hydrocarbons as well as mixtures of these compounds, and also straight-chain dialkyl ethers and cyclic ethers, ketones branched in the $\alpha,\alpha'$-position, saturated or unsaturated perchlorinated aliphatic hydrocarbons and hetero-atom-substituted benzenes, in which the substituents do not react with the amines used and with the hydrogen halides to be separated. Suitable solvents are, for example, decane, tetralin, cis- and trans-decaline, tetradecane, toluene, o-, m- and p-xylene, 1,2,4,5-tetramethylbenzene, isobutylbenzene, pentylbenzene, dodecylbenzene, dibutyl ether, hexyl methyl ether, derivatives of tetrahydrofurane and tetrahydropyrane, and 1,4-dioxane, diisopropyl ketone and 2,6-dimethylcyclohexanone, chlorobenzene, nitrobenzene, dichlorobenzenes and perchloroethylene.

The concentration of the amine in the solution is not critical and is restricted only by a possible limit to the solubility, at the temperature chosen, of the dihydrohalogen adducts formed. The rate at which the mixture of hydrogen chloride and hydrogen bromide is passed through the amine solution can be chosen over a wide range and is dependent only on the capacities of the apparatus as long as sufficient contact between the liquid and gaseous phases is ensured. This is achieved in an advantageous manner by the use of packings in a column.

Because of the surprising fact that amine hydrobromides are considerably more difficult to split by the action of heat than are amine hydrochlorides under analogous conditions and that gaseous hydrogen bromide displaces the hydrogen chloride from amine hydrochlorides, the following embodiments are available for carrying out the process according to the invention:

(I) The mixture of hydrogen chloride and hydrogen bromide is treated at a temperature which is below the boiling point of the solvent. The hydrogen chloride is then first split off, by the action of heat, from the amine hydrochlorides in the resulting mixture of amine hydrochlorides and amine hydrobromides and is optionally removed by means of a stream of inert gas. Inert gases which can be used are, for example, nitrogen, argon and ethylene.

In order to prevent breakthrough of hydrogen bromide, it is appropriate to displace only up to 50% of the bonded hydrogen chloride. The solvents preferably have vapor pressures which are as low as possible at the dissociation temperature employed and the boiling point of the solvents should be as high as possible above, but at least 20° C. above, the dissociation temperature employed, in order to keep the amount removed as vapor in the stream of inert gas as small as possible.

After the quantitative decomposition of the amine hydrochlorides and complete removal of the hydrogen chloride, the hydrogen bromide is then split off from the residual amine hydrobromides with the aid of a base.

Suitable bases are, for example, sodium hydroxide, potassium hydroxide, calcium hydroxide, barium hydroxide, sodium carbonate and potassium carbonate.

Hydrogen bromide is separated off in the range between room temperature and the boiling point of the amine/solvent mixture, since hydrogen bromide is not split off as a gas even at the boiling point. However, it is appropriate to carry out the process without supplying heat. The hydrogen bromide, which, for example, is obtained in the form of sodium bromide, is recovered as sodium bromide or after oxidation, to bromine.

(II) The mixture of hydrogen chloride and hydrogen bromide is treated with the solution of an amine at a temperature at which although the amine hydrobromides are still stable to heat, the corresponding amine hydrochlorides, however, are essentially split into the amine and hydrogen chloride, that is to say only hydrogen bromide is enriched in the solution. In general, with this embodiment, a temperature is chosen which corresponds to the boiling point of the amine/solvent mixture used or is slightly below this; and it is preferably about 20° C. below the boiling point of the amine/solvent mixture.

When about 30 to 70% and preferably 50% of the amine initially introduced has been saturated with hydrogen bromide, the stream of gas consisting of hydrogen chloride and hydrogen bromide, which is to be separated, is replaced by a stream of inert gas. After complete removal of the hydrogen chloride, the hydrogen bromide is then split off with a base—as described under I—from the amine hydrobromides and optionally recovered. The solution of the amine which remains at the end of both embodiments I and II passes back into the separation process, after prior purification if desired.

The process according to the present invention is illustrated by the specific Examples and Comparison Examples which follow.

Unless stated otherwise, all percentages quoted are percentages by weight.

The bromine content and chlorine content were determined as follows:

(a) Wet chemical determination of bromine in the presence of chlorine:

The acid, $Na_2SO_3$-containing solution of NaCl/NaBr in $H_2O$ is treated with $CrO_2Cl_2$ and the $Br_2$ evolved is distilled off and collected in $NaAsO_2$ solution. The resulting HBr is determined titrimetrically with 0.001 N $AgNO_3$.

(b) Determination of bromine by X-ray fluorescence:

The organic solution of amine hydrobromide is determined with the aid of a previously plotted calibration curve. The chlorine content of the sample can also be determined by this method.

COMPARISON EXAMPLE A 97 grams (0.25 mol) of tri-2-ethylhexylammonium chloride were dissolved in 88 grams of xylene and the solution was heated to the reflux temperature in a ½ liter round-bottomed flask containing a magnetic stirrer and provided with a 30 cm column of Raschig rings and a reflux condenser, while passing 10 liters of nitrogen per hour through the solution. A bottom temperature of 135° C. results. The stream of nitrogen which passes through the condenser was fed through two wash bottles which were connected one behind the other and were charged with 0.5 N sodium hydroxide solution. After 3 hours, 0.24 mol of hydrogen chloride, corresponding to a yield of 96%, was found in the receivers by titrimetric determination.

EXAMPLE 1

80 grams (0.184 mol) of tri-2-ethylhexylammonium bromide were dissolved in 79 grams of 3-phenylpentane and the solution was heated under reflux at 185° to 195° C. in an apparatus analogous to Comparison Example A. After 4.3 hours, only 4.7%, and after 12.1 hours, only 5.3% of the hydrogen bromide employed was detectable in the receivers.

COMPARISON EXAMPLE B

Hydrogen chloride from a commercially available gas bomb was fed via two bubble counters, which were connected counter to one another and one of which was charged with concentrated sulphuric acid, and three cold traps (−50° C.) into an absorption vessel which contained 40.0 grams (1.0 mol) of sodium hydroxide dissolved in 200 ml of water. With an input rate of 45 liters/hour, the sodium hydroxide solution initially introduced was neutralized after about 30 minutes. Analysis showed that the hydrogen chloride had a hydrogen bromide content of 70±4 ppm (detection limit of the analytical method used: 5 mg of HBr in 1,000 g of HCl $\hat{=}$ 5 ppm).

EXAMPLE 2

Between the second bubble counter and the first cold trap of the absorption apparatus described in Comparison Example B a 96 cm long glass tube 3 cm in diameter was inserted, which had a porcelain frit just above the tap fitted at the bottom and carried a ball of foam as the upper closure. A solution of 200 grams (0.47 mol) of tri-2-ethylhexylamine dihydrochloride in 200 grams of tert.-butyl-m-xylene (TBMX), corresponding to a 45 percent strength by weight solution of the amine in TBMX, was introduced into the tube packed with glass Raschig rings and hydrogen chloride was introduced as a gas through the frit. The solution first became saturated with hydrogen chloride, with a slightly exothermic reaction. After saturation had taken place, further hydrogen chloride was fed in as in Comparison Example B and after this had passed through the solution in the form of finely divided bubbles it was finally absorbed with 5 N sodium hydroxide solution. The input rate was varied and the solution initially introduced was not replaced. With throughput rates of 4.5 liters/hour, 8 liters/hour, 11 liters/hour and 22.5 liters/hour, no hydrogen bromide could be detected in the absorbed gas.

EXAMPLE 3

50.0 g (0.157 mol) of N,N-dioctylaniline, which had been converted to its hydrochloride, in 300 g of di-n-butyl ether, corresponding to a 14.3 percent strength solution, were employed in an apparatus according to Example 2. After saturating with hydrogen chloride and passing hydrogen chloride through at 15 liters/hour, no hydrogen bromide was found in the absorbed hydrogen chloride.

EXAMPLE 4

70 grams (0.341 mol) of p-2-ethylhexylaniline, in the form of the hydrochloride, in 280 g of tetrachloroethylene, corresponding to a 25 percent strength solution, were employed in the apparatus according to Example 2. With an input rate of 15 liters/hour, no hydrogen bromide was found in the absorbed hydrogen chloride.

EXAMPLE 5

100 grams (0.487 mol) of N-octylaniline, in the form of the hydrochloride, in 250 g of nitrobenzene, corresponding to a 40 percent strength solution, were employed in the apparatus according to Example 2. With an input rate of 15 liters/hour, no hydrogen bromide was found in the absorbed hydrogen chloride.

EXAMPLE 6

A mixture of 86.3 grams (222.4 mmols) of tri-2-ethylhexylamine, 6.3 grams (77.8 mmols) of HBr and 10.5 grams (288.1 mmols) of HCl in 100 g of xylene was initially introduced into an apparatus analogous to Comparison Example A and brought to the reflux temperature (140° C.). After 11.5 grams (287.5 mmols) of NaOH had been consumed in the receivers, xylene was removed from the bottom product under a waterpump vacuum and the residual amounts of HCl and HBr were determined in the residue. While no further hydrogen chloride was found, the hydrogen bromide content was determined as 6.8% (calculated: 6.8%). The hydrogen bromide is recovered as reported in Kirk-Othmer "Encyclopedia of Chemical Technology" 3rd ed., vol. 4 (1978) pp. 233, 245.

We claim:

1. A method for separating a first mixture of hydrogen chloride and hydrogen bromide as a function of the difference in the stability to heat of amine hydrobromides and amine hydrochlorides, comprising:
    (a) treating said first mixture with a solution of an amine and producing a second mixture of amine hydrochlorides and amine hydrobromides;
    (b) heating said second mixture to a temperature at which the amine hydrobromides are stable to heat and the corresponding amine hydrochlorides are no longer stable to heat and splitting off hydrogen chloride;
    (c) separating off said hydrogen chloride in the gaseous phase and leaving said amine hydrobromides in the liquid phase;
    (d) treating said amine hydrobromides in the liquid phase with a base to remove said hydrogen bromide as a bromine salt; and
    (e) recovering said bromine salt.

2. The method of claim 1, wherein said amines are selected from the group consisting of tertiary alkylamines, tertiary aryldialkylamines, secondary arylalkylamines, primary alkylarylamines and mixtures thereof, said amines having 14 to 36 carbon atoms in the nitrogen-bonded side chains, said side chains having nitrogen-bonded methyl group and at least one nitrogen-bonded aliphatic radical containing at least 6 carbon atoms.

3. The method of claim 2, wherein said solution is formed with a solvent having a boiling point of at least 120° C. selected from the group consisting of straight-chain or branched aliphatic, cycloaliphatic, aromatic or araliphatic hydrocarbons and mixtures of these compounds, straight-chain dialkyl ethers and cyclic ethers, ketones branched in the α,α'-position, saturated or unsaturated perchlorinated aliphatic hydrocarbons and chlorobenzene, nitrobenzene and dichlorobenzenes.

4. A method for separating a first mixture of hydrogen chloride and hydrogen bromide as a function of the difference in stability to heat of amine hydrobromides and amine hydrochlorides, comprising:
   (a) treating said first mixture with a solution of an amine and producing a second mixture of amine hydrochlorides and amine hydrobromides;
   (b) heating said second mixture to a temperature at which the amine hydrobromides are stable to heat and the corresponding amine hydrochlorides are no longer stable to heat and splitting off hydrogen chloride;
   (c) separating off said hydrogen chloride in the gaseous phase and leaving said amine hydrobromides in the liquid phase;
   (d) treating said amine hydrobromides in the liquid phase with a base to remove said hydrogen bromide as a bromine salt;
   (e) separating said bromine salt from said solution of an amine; and
   (f) recirculating said solution of an amine from step (e) to step (a).

5. The method of claim 4, wherein said amines are selected from the group consisting of tertiary alkylamines, tertiary aryldialkylamines, secondary arylalkylamines, primary alkylarylamines and mixtures thereof, said amines having 14 to 36 carbon atoms in the nitrogen-bonded side chains, said side chains having nitrogen-bonded methyl group and at least one nitrogen-bonded aliphatic radical containing at least 6 carbon atoms.

6. The method of claim 5, wherein said solution is formed with a solvent having a boiling point of at least 120° C. selected from the group consisting of straight-chain or branched aliphatic, cycloaliphatic, aromatic or araliphatic hydrocarbons and mixtures of these compounds, straight-chain dialkyl ethers and cyclic ethers, ketones branched in the α,α'position, saturated or unsaturated perchlorinated aliphatic hydrocarbons and chlorobenzene, nitrobenzene and dichlorobenzenes.

7. The method of claim 4, wherein said first mixture comprises 0.001 to 99% hydrogen bromide by weight.

8. The method of claim 7, wherein said first mixture comprises about 20 to 80% hydrogen bromide by weight.

9. The method of claim 7, wherein said heating step (c) is carried out at a temperature of about 100°–250° C.

10. The method of claim 9, wherein said temperature is about 120°–230° C.

11. The method of claim 6, wherein said amine has a concentration in said solution of solvent of about 5 to 70% by weight.

12. The method of claim 11, wherein said concentration is about 35 to 60% by weight.

13. The method of claim 11, wherein said hydrogen chloride separated off in step (c) has a hydrogen bromide concentration less than 5 parts per million.

14. The method of claim 4, wherein said amine hydrochlorides are selected from the group consisting of trihexylammoniumchloride, tri-2-ethylhexylammoniumchloride, and N,N-dioctylaniline-hydrochloride and said amine hydrobromides are selected from the group consisting of trihexylammoniumbromide, tri-2-ethylhexylammoniumbromide and N,N-dioctylaniline-hydrobromide.

15. The method of claim 4, wherein the base of step (d) is selected from the group consising of sodium hydroxide, potassium hydroxide, calcium hydroxide, barium hydroxide, sodium carbonate and potassium carbonate.

16. The method of claim 4, wherein said amine has a concentration in said solvent of about 5 to 70% by weight, said amine is selected from the group consisting of trihexylamine, triheptylamine, trioctylamine, cyclohexyl-diisooctylamine, tri-2-ethylhexyl-amine, di-2-ethylhexyl-methylamine, didecyl ethylamine, tri-dodecyl-amine, di-dodecyl-methyl-amine, dodecyl-diisopropyl-amine, dodecyl-di-butyl-amine, dodecyl-diisobutyl-amine, dodecyl-isobutyl-methyl-amine, diisopentadecyl-methyl-amine, diisopentadecyl-ethyl-amine, diisopentadecylisopropyl-amine, N-octyl-aniline, N-2-ethylhexylaniline, N-laurylaniline, N-isotridecylaniline, N-isopentadecylaniline, N-stearylaniline, N,N-dihexylaniline, N,N-dioctylaniline, N,N-di-2-ethylhexylaniline, N,N-di-dodecylaniline, N-dodecyl-N-methyl-aniline, N-dodecyl-N-ethylaniline, N-dodecyl-N-hexyl aniline, N,N-dihexyl-p-toluidine, N,N-di-2-ethylbutyl-p-toluidine, N,N-diheptyl-p-toluidine, N,N-dioctyl-p-toluidine and N,N-di-2-ethylhexyl-p-toluidine; and said solvent is selected from the group consisint of decane, tetralin, cis-declain, transdeclain, tetradecane, toluene, o-xylene, m-xylene and p-xylene, 1,2,4,5-tetramethylbenzene, isobutylbenzene, pentylbenzene, dodecylbenzene, dibutyl ether, hexyl methyl ether, derivatives of tetrahydrofurane and tetrahydropyrane, 1,4-dioxane, diisopropyl ketone, 2,6-dimethylcyclohexanone, chlorobenzene, nitrobenzene, dichlorobenzenes and perchloroethylene.

* * * * *